United States Patent [19]

Nemoto

[11] Patent Number: 4,989,235
[45] Date of Patent: Jan. 29, 1991

[54] INTEGRATED COMMUNICATION SYSTEM FOR ENSURING EFFECTIVE USE OF CHANNELS

[75] Inventor: Junichiro Nemoto, Hachioji, Japan

[73] Assignee: Kabushiki Kaisha Toshiba, Kawasaki, Japan

[21] Appl. No.: 327,623

[22] Filed: Mar. 24, 1989

[30] Foreign Application Priority Data

Mar. 31, 1988 [JP] Japan .................. 63-78718

[51] Int. Cl.⁵ .......................................... H04M 11/00
[52] U.S. Cl. .......................................... 379/96; 379/215
[58] Field of Search ............... 379/93, 94, 96, 215; 370/62, 85.7, 95.1

[56] References Cited

U.S. PATENT DOCUMENTS

| 4,715,059 | 12/1987 | Cooper-Hart et al. | 379/98 X |
| 4,794,639 | 12/1988 | Urui et al. | 379/96 X |
| 4,852,151 | 7/1989 | Dittakavi et al. | 379/215 |

FOREIGN PATENT DOCUMENTS 1-13855   1/1989   Japan ........................ 379/94
2169172   7/1986   United Kingdom ........ 379/94

Primary Examiner—Jin F. Ng
Assistant Examiner—Stella L. Woo
Attorney, Agent, or Firm—Finnegan, Henderson, Farabow, Garrett and Dunner

[57] ABSTRACT

An integrated communication system comprising a transfer path including first and second channels, a first terminal including a section for transmitting a first signal and generating a channel change code, an exchange section coupled to the transfer path and the first terminal, for generating a switching command in response to the channel change code from the first terminal, and exchanging the first signal between the first terminal and the second channel in accordance with the switching command, the first signal being exchanged between the first channel and the first terminal when the switching command is not generated, and a second terminal coupled to the transfer path and including a section for receiving the switching command from the transfer path, and receiving the first signal from the second channel in accordance with the switching command.

12 Claims, 5 Drawing Sheets

INTEGRATED COMMUNICATION SYSTEM FOR ENSURING EFFECTIVE USE OF CHANNELS

BACKGROUND OF THE INVENTION

1. Field of the Invention

The present invention relates to an audio signal/data signal integrated communication system which uses an audio signal channel and a data signal channel, and, more particularly, to an audio signal/data signal integrated communication system which can make effective use of channels.

2. Description of the Related Art

According to a conventional audio signal/data signal integrated communication system, a data terminal can be coupled to a digital telephone which is coupled to a primary transfer line serving to transfer an audio signal and a data signal. An interrupt transfer line separate from the primary transfer line is coupled to the digital telephone to permit a third party to make an interrupt telephone communication over the interrupt transfer line. However, such a digital telephone needs two transfer controllers respectively for the primary transfer line and interrupt transfer line. This inevitably enlarges the telephone and increases the manufacturing cost. For connection of such a telephone, two lines are used on the side of an exchange, thus impairing the system efficiency.

This problem may be solved by preparing a device for exclusive use for the interrupt telephone communication and using the device in parallel with the digital telephone or together with an additional telephone. This, however, requires a large space for device installment and would still have the aforementioned problem of increasing the cost of the total system.

SUMMARY OF THE INVENTION

Accordingly, it is an object of this invention to provide an integrated communication system and method which makes effective use of channels.

According to a first aspect of the present invention, an integrated communication system is provided. The system has a plurality of telephone units; at least one data terminal; switching means for selectively connecting the plurality of telephone units and the data terminal to transfer a frame comprising fixed length message portions with each of the message portions carrying information and an external controller connected to a first telephone of the plurality of telephones, the data terminal, and the switching means. The external controller has a data path for transferring data information carried on a first message portion to and from the data terminal, a main speech path for transferring audio information carried on a second message portion to and from the first telephone, and an optional speech path for transferring interrupt information to one of the telephones. The switching means includes an optional control means for assigning interrupt information to the first message portion. Therefore, the first message portion carries data information and interrupt information.

According to another aspect of the present invention, an integrated communication method is provided for an integrated communication system having a plurality of telephone units; a plurality of data terminals; switching means for selectively connecting the plurality of telephone units and the data terminal to transfer a frame comprising fixed length message portions with each of the message portions carrying information; and an external controller connected to a first telephone of the plurality of telephones, a first data terminal of the plurality of data terminals, and the switching means. The external controller has a data path for transferring data information carried on a first message portion to and from the data terminal, a main speech path for transferring audio information carried on a second message portion to and from the first telephone, and an optional speech path for transferring interrupt information to one of the telephones. The integrated communication method includes the steps of generating the interrupt information during a transfer of frames to and from the first telephone and during a transfer of frames to and from the first data terminal, and assigning the interrupt information to the first message portion of a frame.

According to the present integrated communication system described above, no exclusive line is needed for an interrupt telephone communication. The effective use of a data channel ensures telephone communication even upon occurrence of an interrupt telephone communication. The exchange can be coupled to terminals whose quantity corresponds to the number of communication lines and these couplings can be exchanged with one another. This can improve the efficient use of the system and can contribute to reduction in the cost of the system.

BRIEF DESCRIPTION OF THE DRAWINGS

FIG. 6 is a flowchart for explaining the operation of an exchange; and

DETAILED DESCRIPTION OF THE PREFERRED EMBODIMENTS

An audio signal/data signal integrated communication system according to one preferred embodiment of this invention will now be described as compared with a conventional system in conjunction with the accompanying drawings.

Figure 1:
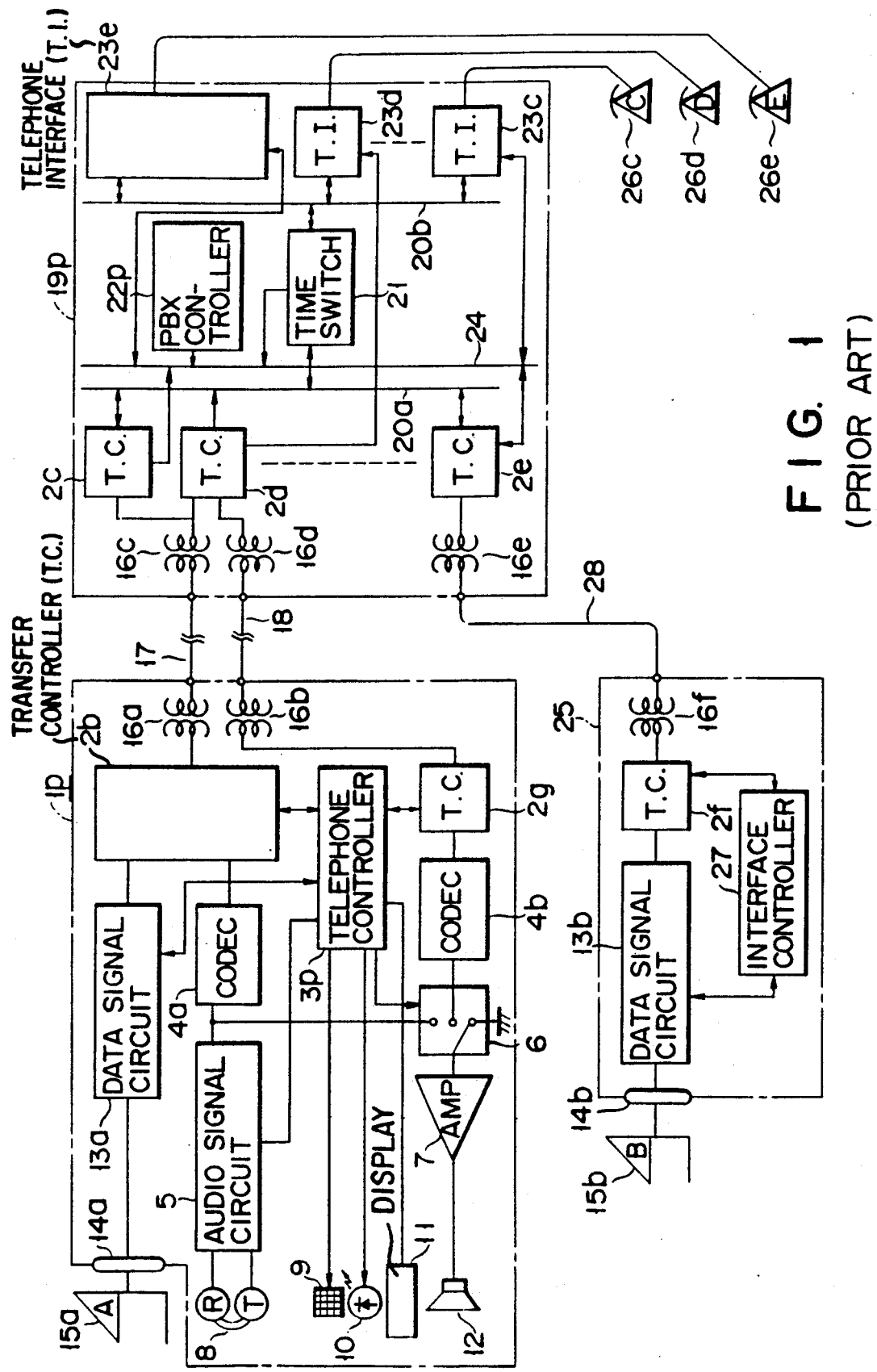
FIG. 1 is a block diagram illustrating the arrangement of a conventional integrated communication system.

To begin with, a description will be given of the arrangements of the integrated communication system of this invention and the conventional system, referring to FIGS. 1 and 2. FIG. 1 illustrates the conventional system, and FIG. 2 the present system; the same reference numerals are used to specify corresponding or identical components with their description being omitted.

Figure 2:
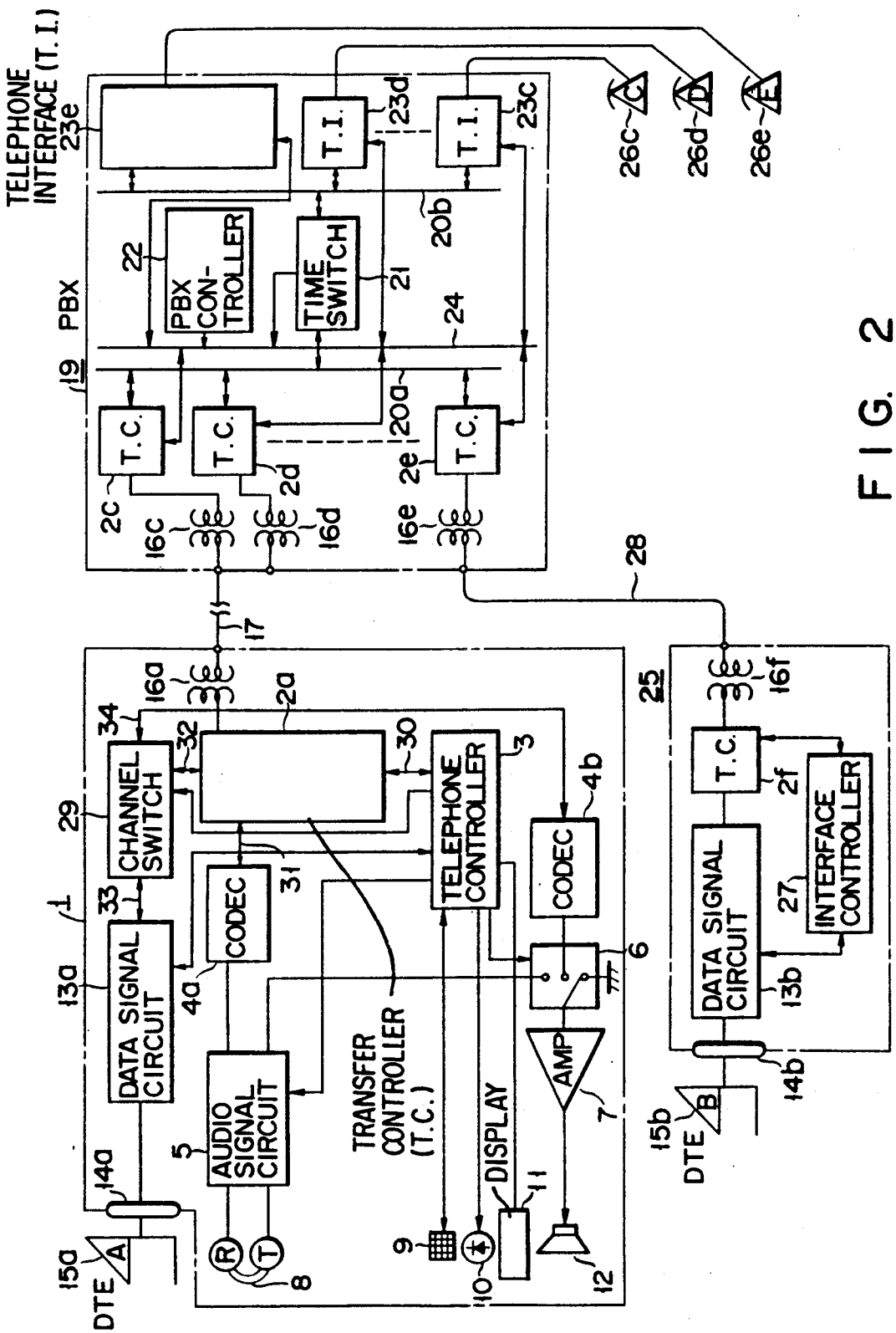
FIG. 2 is a block diagram illustrating the arrangement of an integrated communication system according to one embodiment of this invention.

Referring to FIG. 2, according to the present integrated communication system, a private branch exchange (PBX) 19 is coupled to a digital telephone 1 through a transfer path 17, to a data interface device 25 through a transfer path 28, and to telephones 26c, 26d and 26e. The telephone 1 and the data interface device 25 are respectively coupled to asynchronous data terminal equipments (DTEs) 15a and 15b through connectors 14a and 14b. These data terminal equipments 15a and 15b are personal computers, etc. which have a protocol to permit switching between a communication mode and a command mode (well-known Hayes commands). Referring now to FIG. 1, according to the conventional integrated communication system, a PBX 19p is coupled to a digital telephone 1p through transfer paths 17 and 18; the other part has the same arrangement as that of the present integrated communication system.

Referring to FIG. 2, the telephone 1 is coupled to the PBX 19 through a transfer transformer 16a and the transfer path 17, and has a transfer controller 2a for providing matching with the PBX 19. At the time of signal transmission, the transfer controller 2a multiplexes input PCM audio, data and control signals in an audio signal channel, data signal channel and control channel of a transfer frame. At the time of signal reception, to acquire the PCM audio signal, data signal and control signal, a transfer frame received through the transfer path 17 and transformer 16a is separated into the audio signal channel, data signal channel and control channel.

A telephone controller 3 coupled to the transfer controller 2a controls the general operation of the telephone 1. The controller 3 is also coupled to a key-in section 9, an LED 10 and a display 11. The key-in section 9 is provided with dial keys for entering a destination dial when making a call and function keys for receiving various special services. The controller 3 generates various control commands in accordance with control data represented by a control signal coming through a line 30 from the transfer controller 2a or control data entered through the key-in section 9. In accordance with the control data, the controller 3 energizes the light emitting diode LED 10 which indicates the status of the telephone 1, and controls characters, etc. displayed on the display 11. Further, the controller 3 sets the speed of communication for a data signal circuit 13a in accordance with set data from the asynchronous data terminal equipment (DTE) 15a.

A primary telephone communication section comprises a CODEC 4a, an audio signal circuit 5 and a handset 8. The CODEC 4a, which is coupled to the transfer controller 2a and circuit 5, converts a PCM audio signal input over the line 31 from the controller 2a into an analog audio signal and sends the audio signal to the circuit 5. The CODEC 4a also converts an analog audio signal from the circuit 5 into a PCM audio signal and sends it to the controller 2a over the line 31. The audio signal circuit 5 is coupled to the CODEC 4a and the handset 8 and serves as an interface therebetween in accordance with a telephone communication control command from the controller 3.

A channel switch 29 is coupled through a line 32 to the controller 2a, and connects this line 32 to either a line 33 or 34 in accordance with a channel switch control command from the controller 3. A data communication control section has a data signal circuit 13a, which is coupled to the channel switch 29 through the line 33 and to the asynchronous data terminal 15a through a connector 14a. The circuit 13a controls the data communication in accordance with a data communication control command from the controller 3. The circuit 13a also transfers a data signal, input over the line 33, to the data terminal equipment 15a at a communication speed thereof and transfers a data signal from the data terminal equipment 15a onto the line 33 at a communication speed of a data channel in accordance with a communication speed set command from the controller 3.

An optional communication section comprises a CODEC 4b, a switch 6, an amplifier 7 and a speaker 12. The CODEC 4b, which is coupled through the line 34 to the channel switch 29, converts a PCM audio signal on the line 34 into an analog audio signal and sends it to the switch 6. The switch 6 sends one of the audio signal from the CODEC 4b, a ringing from the circuit 5 informing of a incoming call and a dial tone (DT) generated in an OFF-hook state to the amplifier 7 in accordance with a switch control signal from the controller 3. The amplifier 7 amplifies the received audio signal to a sufficient volume level and drives the speaker 12.

Referring now to FIG. 1, the conventional digital telephone 1p is coupled to the PBX 19 through the transfer paths 17 and 18. This telephone 1p does not have the channel switch 29 of the present telephone 1 (see FIG. 2) but has instead transfer controllers 2b and 2g respectively coupled to the transfer paths 17 and 18 through transfer transformers 16a and 16b. The controllers 2b and 2g have the same structure as the controller 2a of the present telephone. The controller 2g outputs a control signal, coming over the transfer path 18, to a telephone controller 3p and outputs a PCM audio signal to a CODEC 4b of an optional communication section.

Referring to FIG. 2, the PBX 19 has a PBX controller 22 for controlling an exchange process of a local line and an exclusive line. The PBX 19 further has a PCM highways 20a and 20b, a control bus 24, a time switch 21, transfer controllers 2c, 2d, ..., 2e, and telephone interfaces 23c, 23d, ..., 23e. In accordance with a time slot control command coming through the control bus 24 from the controller 22, the time switch 21 switches signals within time slots on the highways 20a and 20b in such a way as to form a communication path, in a time-sharing manner, between extension lines or between a local line and an extension line. The analog telephone interfaces 23c, 23d and 23e interface between the PBX 19 and the analog telephones 26c, 26d and 26e. For instance, the interface 23c converts an analog audio signal from the analog telephone 26c into a PCM audio signal and sends it to a predetermined time slot of the highway 20b. The interface 23c also latches a PCM audio signal from the predetermined time slot of the highway 20b, converts it into an analog audio signal and outputs the resultant signal to the analog telephone 26c. This ensures telephone communication. The transfer controllers 2c, 2d and 2e, like the controller 2a, interface between the PBX 19 and the respective digital terminal equipments. For instance, at the time of signal transmission, the transfer controller 2c multiplexes a PCM audio signal and data signal in a predetermined time slot on the highway 20a and a control signal on the control bus 24 in the audio signal channel, data signal channel and control channel to form a transfer frame and sends the frame over the transfer path 17 to the telephone 1. At the time of signal reception, the controller 2c separates a transfer frame received through the transfer path 17 into the audio signal channel, data signal channel and control channel in order to output the PCM audio signal and data signal to a predetermined time slot on the highway 20a and the control signal on the control bus 24.

When a soft paging command is entered by operation of special dials or function keys for an interrupt telephone communication, the controller 22 discriminates whether or not the telephone 1 on the side of a caller is making a data communication and sets a busy flag. The controller 22 also transmits an interrupt command over the control channel to temporarily interrupt data communication between the terminal equipment 15a coupled to the caller's telephone 1 and, for example, the terminal equipment 15b.

Referring to FIG. 1, upon reception of the soft paging command, the convention PBX sends a control signal to time switch 21 so that a PCM audio signal for an interrupt telephone communication is transferred through the controller 2d to the telephone 1P. Accordingly, the analog audio signal for the interrupt telephone communication which is input to the telephone interface 23C from the telephone 26c is converted into the PCM audio signal before the signal is sent on the highway 20b. The time slot for the PCM audio signal is switched, by the time switch 21, from the time slot on the highway 20b corresponding to the interface 23c to the one corresponding the controller 2d. The PCM audio signal taken by the controller 2d is multiplexed together with signals in the data signal channel and control channel in a transfer frame, which in turn is transferred to the telephone 1P over the transfer path 18. In the telephone 1P, the transfer frame is separated by the controller 2g into the audio signal channel, data signal channel and control channel. The PCM audio signal in the audio signal channel is subjected to D/A conversion by the CODEC 4b, and the analog signal is sent through the switch 6 to the amplifier 7 which amplifies it to a predetermined level and is then produced as sound through the speaker 12.

The data interface device 25 comprises a data signal circuit 13b, transfer controller 2f, interface controller 27, and a transfer transformer 16f, and serves as an interface between the PBX 19 and asynchronous data terminal equipment 15b such as a personal computer, which have different communication protocols (communication speed or sequence). The circuit 13b is the same as the circuit 13a, and the controller 2f as the controller 2a. The controller 27 controls the transfer controller 2f and circuit 13b in accordance with the control signal from the PBX 19 or set data from the terminal equipment 15b.

A description will now be given of the operation of the present integrated communication system with reference to FIGS. 3 through 7.

Figure 3:
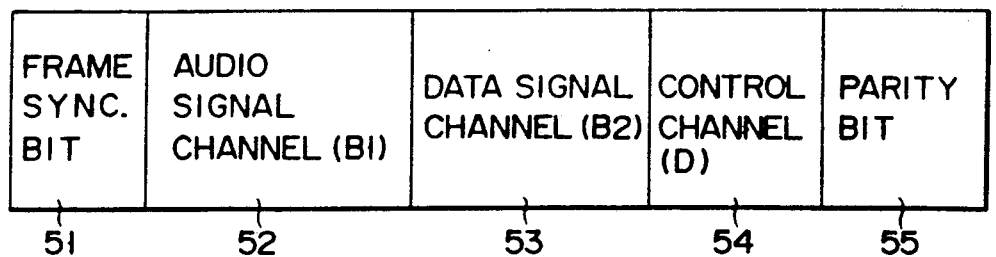
FIG. 3 is a diagram illustrating a format of a transmission frame.

FIG. 3 illustrates a format of a transfer frame used in the present integrated communication system. In FIG. 3 the transfer frame is constituted by a frame sync bit 51 for providing synchronization, an audio signal channel (B1 channel) 52 assigned to an audio signal, a data signal channel (B2 channel) 53 assigned to a data signal, a control channel (D channel) 54 assigned to a control signal and a parity bit 55. The audio signal and data signal channels 52 and 53 each consist of eight bits and are sent at 64 Kbps. The control channel 54 consists of two bits and is sent at 16 Kbps. The frame sync bit 51 and parity bit 55 each consists of one bit. The transfer frame therefore consists of 20 bits in total.

A description will now be given of a telephone communication initiated by a call made to, for example, the telephone 1 by the telephone 26c. As the operation in this case is similar to the conventional case, this description will be given briefly.

Dial-in data from the telephone 26c is output to the PBX controller 22 through the telephone interface 23c and control bus 24. The controller 22 informs the telephone 1 of the call. The telephone controller 3 generates a sound source select control command in accordance with the control signal received at the transfer controller 2a. As a result, a calling tone is generated by the speaker 12. The controller 22 transmits a control signal representing control data to the telephone 1 in accordance with a response from the telephone 1. In the telephone 1, the control signal is received at the controller 2a and is then sent to the telephone controller 3, which in turn generates a telephone communication control command in accordance with the received control signal. The controller 22 also outputs a time switch control command to the time switch 21 so as to exchange the data in a time slot on the highway 20b assigned to the interface 23c with the data in a time slot on the highway 20a assigned to the controller 2c.

An audio signal from the telephone 26c is converted into a PCM audio signal by the interface 23c through A/D conversion and is sent over to a predetermined time slot on the highway 20b. The time switch 21 switches the PCM audio signal to a predetermined time slot on the PCM highway 20a. The PCM audio signal on the highway 20a is latched by the controller 2c. The controller 2c puts the PCM audio signal onto the audio signal channel to multiplex it together with other channels and sends the resultant frame to the telephone 1 through the transfer path 17. The controller 2a of the telephone 1 receives the transfer frame through the transfer transformer 16a. This frame is separated into the audio signal channel, data signal channel and control channel, and the PCM audio signal on the audio signal channel is supplied to the CODEC 4a. The CODEC 4a converts the PCM audio signal into an analog audio signal through D/A conversion and outputs it to the audio signal circuit 5. The analog audio signal has its communication level adjusted to a predetermined level by the circuit 5 before reaching the receiving section of the handset 8.

An audio signal from the handset 8 has its level adjusted to the predetermined level by the circuit 5 and is converted into a PCM audio signal through A/D conversion by the CODEC 4a. The PCM audio signal is multiplexed in the audio signal channel of a transfer frame by the transfer controller 2a and is sent to the PBX 19 through the transformer 16a and transfer path 17. The frame received at the PBX 19 is separated into the audio signal, data signal and control channels by the controller 2c. The PCM audio signal on the audio signal channel is sent on a predetermined time slot and is switched to a time slot on the highway 20b corresponding to the telephone interface 23c by the time switch 21. The interface 23c converts the PCM audio signal from that time slot into an analog audio signal and sends it to the telephone 26c. As a result, the audio signal is output as a voice from the receiving section of the handset of the telephone 26c.

A description will now be given of data communication between the data terminal equipment coupled to the telephone 1 and an arbitrary data terminal equipment, e.g., 15b, coupled to an extension line. Data to be transferred to the data terminal equipment 15b from the data terminal equipment 15a has its transfer speed changed by the circuit 13a. The data from the circuit 13a is multiplexed in the data signal channel 53 together with the audio signal channel 52, and control channel 54 by the transfer controller 2a, thereby to provide a transfer frame. This frame is sent through the transfer transformer 16a to the PBX 19 from the controller 2a. The transfer controller 2c of the PBX 19 separates the received frame into the audio signal channel 52, data signal channel 53 and control channel 54, and signals on the individual channels are sent during a predetermined time slot on the PCM highway 20a. The data from the terminal 15a is switched by the time switch 21 into a time slot assigned to the transfer controller 2e. The controller 2e coupled to the data interface device 25 latches data from a corresponding time slot under the control of the controller 22. This latched data is multiplexed on the data signal channel 53 together with the audio signal channel 52 and control signal channel 54, thereby providing a transfer frame. This frame is sent to the data interface device 25 from the controller 2e through the transformer 16e and transfer path 28. In the device 25 the received frame is again separated into the audio signal channel 52, data signal channel 53 and control channel 54. The data signal on the data signal channel 52 is sent through the connector 14b to the data terminal equipment 15b after its speed and electric level are changed by the data signal circuit 13b. The data communication is executed in the above manner. The same procedure should be taken to transfer data to the data terminal equipment 15a from the data terminal equipment 15b.

Figure 4:
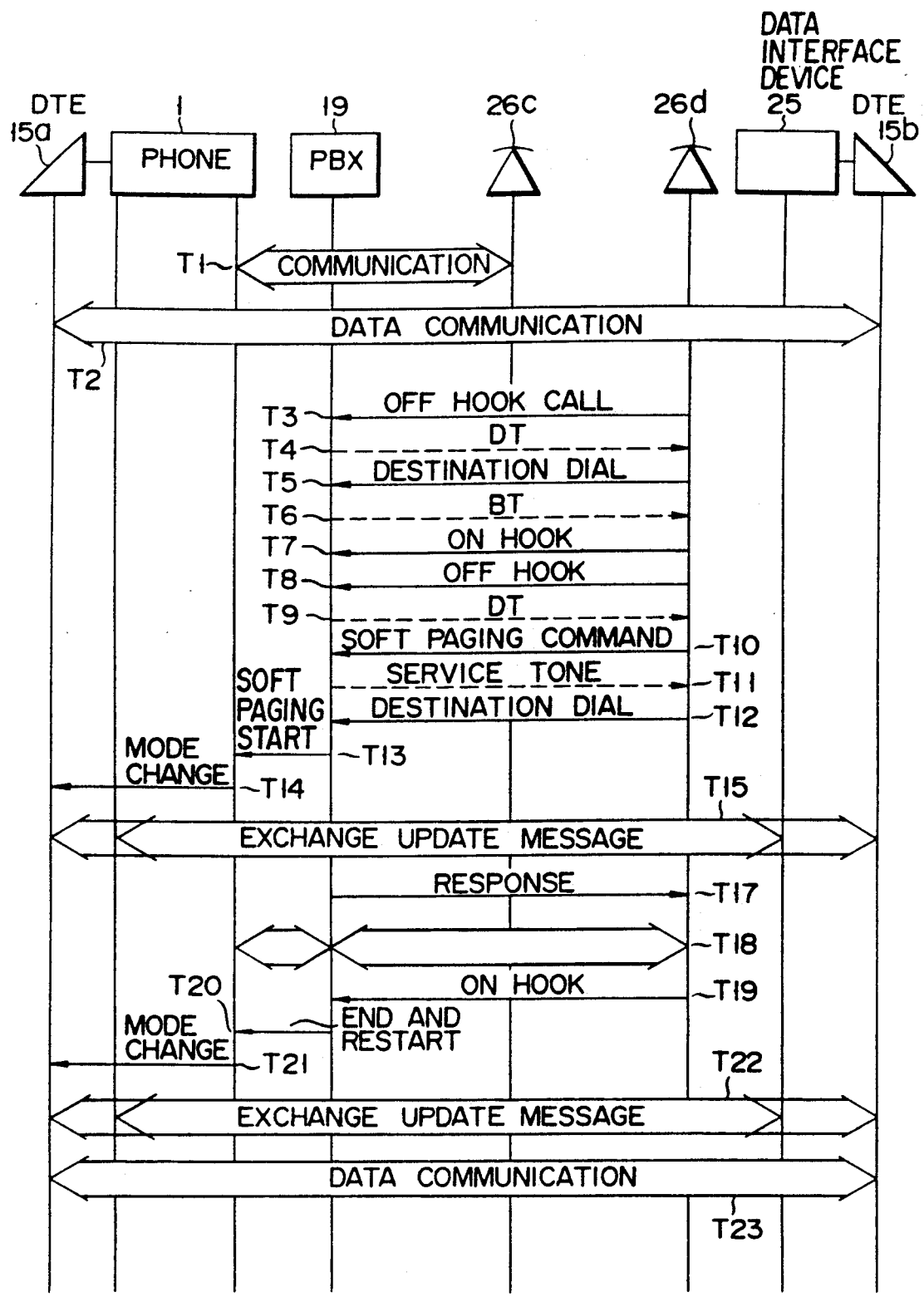
FIG. 4 is a sequence for explaining an operation for realizing an interrupt telephone communication during data communication in the present integrated communication system.
Figure 5:
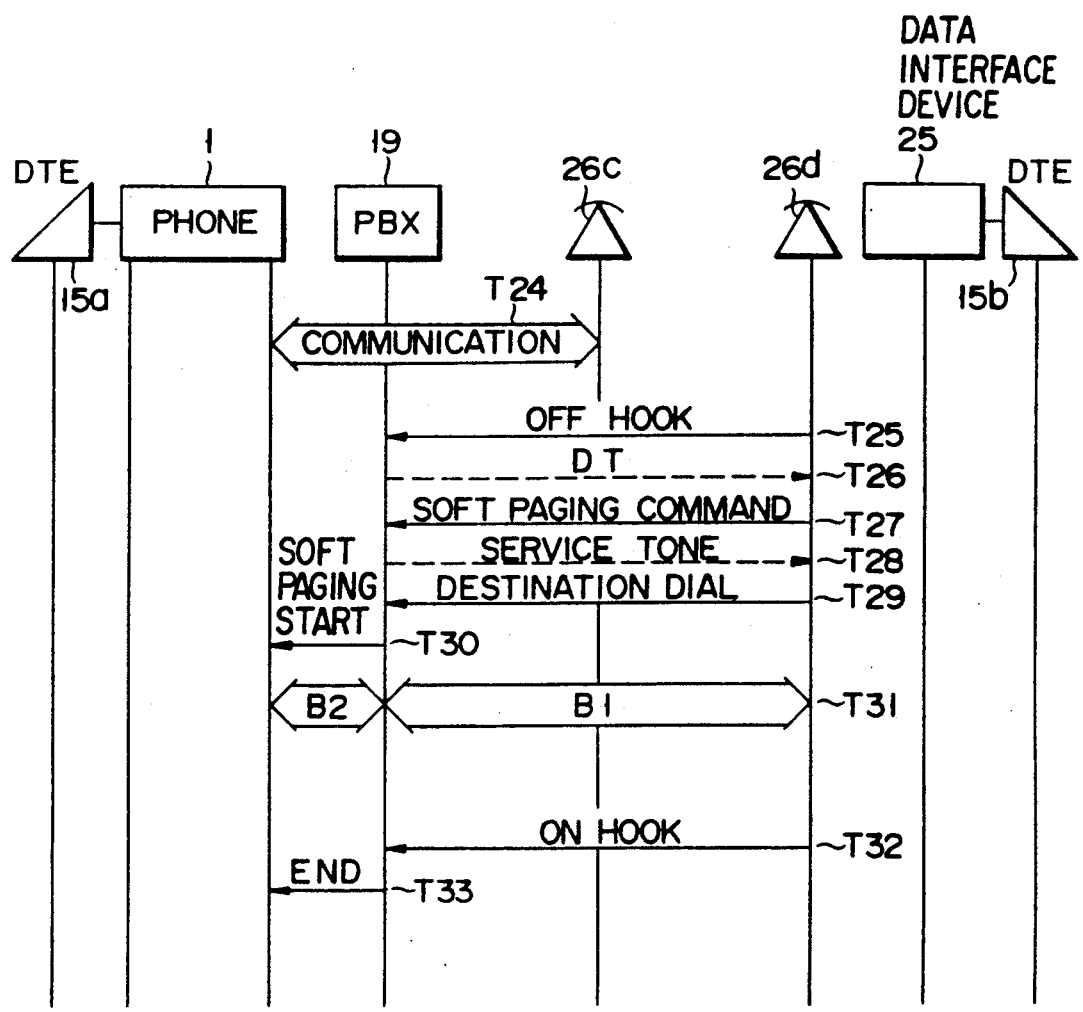
FIG. 5 is a sequence for explaining an operation for realizing an interrupt telephone communication during telephone communication in the present integrated communication system.
Figure 7:
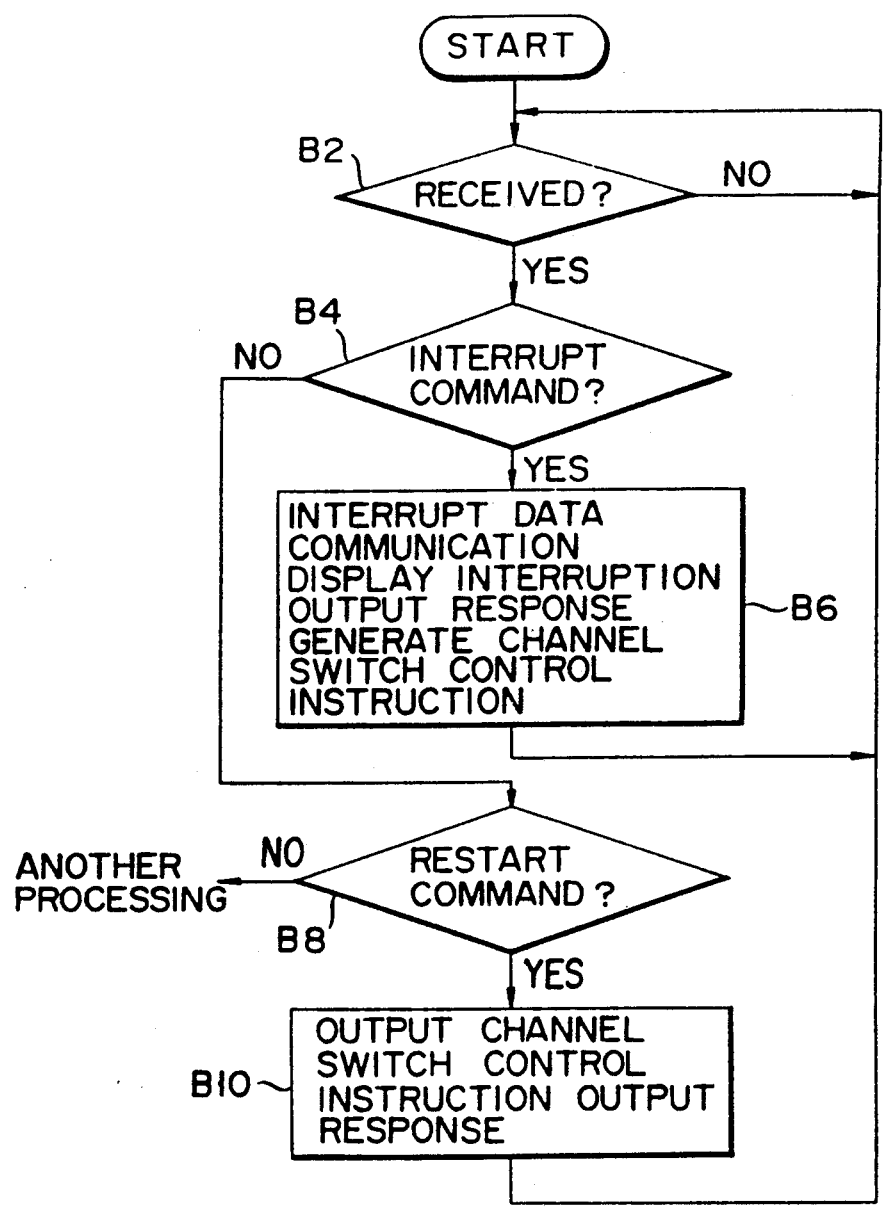
FIG. 7 is a flowchart for explaining the operation of a digital telephone.

Referring to FIG. 4 and FIG. 5, a description will now be given of the operation in a case where a call is made to the telephone 1 by the telephone 26d, for example, when a telephone communication between the telephones 1 and 26c starts at time T1 and data communication between the data terminal equipment 15a and 15b at time T2.

When the handset of the telephone 26d is taken off the hook at time T3, a dial tone is sent to the telephone 26d from the PBX 19 at time T4. At time T5 the destination dial coming from the telephone 26d is sent through the interface 23d to the controller 22. The controller 22 determines whether or not the telephone 1 is busy. If the telephone 1 is busy, a busy tone is returned to the telephone 26d at time T6. As a result, the handset of the telephone 26d is placed on-hooked at time T7.

When it is determined in step A2, shown in FIG. 6, that the handset of the telephone 26d is again off-hooked at time T8, a dial tone is sent to the telephone 26d from the PBX 19 at time T9. At time T10, a special dial or a function key is operated and a soft paging command is generated. This command is sent through the interface 23d to the controller 22. The controller 22 determines at step A4 whether or not the input command is the soft paging command. If it is determined to be the soft paging command, a service tone is sent to the telephone 26d from the PBX 19 at the time T11. If the input command is not the soft paging command, another process will be executed.

When dial data indicating the telephone 1 as the destination is input from the telephone 26d at time T12, in step A6 the controller 22 determines whether or not the telephone 1 is busy. When the data signal channel is used for data communication, the busy flag "1" is set. If the telephone 1 is not busy, step A16 is directly executed. If the telephone 1 is busy, the controller 22 generates an interrupt command and sends it to the transfer controller 2c in step A8. The controller 2c sends a control signal representing the interrupt command to the telephone 1 through the control channel 54.

The interrupt command received at the controller 2a is sent to the controller 3. Upon reception of the control signal in step B2, shown in FIG. 7, the controller 3 determines in step B4 whether or not the received command is the interrupt command. If the decision is affirmative, soft paging is started at time T13 in order to interrupt the data communication in step B6. In response to the interrupt command, the controller 3 generates a mode change command at time T14 and sends it to the circuit 13a. As a result, the mode of the data terminal equipment 15a is changed to the command mode from the communication mode, and the equipments 15a and 15b exchange an update message at time T15. Then, the data communication is interrupted. The controller 3 causes the display 11 to display a guidance "Data communication will be interrupted for a while by an interrupt generated". In order to output a signal on the data signal channel on the line 34, a channel switch control command is sent to the channel switch 29 from controller 3. Further, a sound source change command is sent to the switch 6 to output the audio signal from the CODEC 4b to the amplifier 7. The controller 3 then outputs its response to the PBX 19 at time T17.

The controller 22 sends a switch control command to the time switch 21 at time T17 in such a way that data in the time slot on the highway 20b assigned to the interface 23d is sent during the time slot assigned to the data signal channel 53 of the controller 2c. In step A16, an audio signal transferred from the telephone 26d is converted in a PCM audio signal through A/D conversion by the interface 23d, and this signal is switched by the time switch 21 and is taken by the controller 2c. The PCM audio signal taken is multiplexed on the data signal channel 53 as well as the audio signal channel 52 and control signal channel 54 to produce a transfer frame and the resultant frame is sent over the transfer path 17 to the telephone 1.

In the telephone 1 the PCM audio signal on the data signal channel is sent to the CODEC 4b from the controller 2a through the channel switch 29. The CODEC 4b converts this PCM audio signal into an analog audio signal through D/A conversion and outputs it to the amplifier 7 through the switch 6. The amplifier 7 amplifies the level of the analog audio signal to a predetermined level and sends the resultant signal to the speaker 12. In this manner, an interrupt telephone communication can be effected.

When the handset of the telephone 26d is on-hooked at time T19, it is determined in step A18 that communication has ended. The controller 22 checks in step A20 if a busy flag is set. If the flag is not set, an end command is sent to the telephone 1, thus completing the soft paging process. If the busy flag is set, the end command and a restart command are generated and sent to the telephone 1 at time T20 in step A22. When the controller 3 determines in step B8 that the restart command is received, it sends a channel switch control signal to the channel switch 29 in such a way that the switch 29 outputs the signal on the data signal channel to the circuit 13a. The controller 3 also returns its response to the PBX 19. Further, the controller 3 sends 20 a mode change command to the terminal 15a through the circuit 13a at time T21. The data terminal equipments 15a and 15b exchange an update message at time T22 and restart data communication at time T23.

FIG. 5 illustrates an operation in which a telephone communication between the telephones 1 and 26c is initiated but data communication is not.

The sequential operation from time T25 to time T30 is the same as that ranging from time T8 to time T13 in FIG. 4. In this case, since data communication is not executed, the decision in step A6 is "N." Consequently, an interrupt command will not be sent to the telephone 1 from PBX 19. When the telephone 26c is on-hooked, and the decision in step A20 is "N", only the end command is sent to the telephone 1 from PBX 19. The restart command is not output in this case.

What is claimed is:

1. An integrated communication system, comprising:
   a plurality of telephone units;
   at least one data terminal;
   switching means for selectively connecting the plurality of telephone units and the data terminal to transfer a frame comprising fixed length message portions, each of the message portions carrying information; and
   an external controller connected to a first telephone of the plurality of telephones, the data terminal, and the switching means, the external controller comprising a data path for transferring data information carried on a first message portion to and from the data terminal, a main speech path for transferring audio information carried on a second message portion to and from the first telephone, and an optional speech path for transferring interrupt information to one of the telephones;
   wherein the switching means includes an optional control means for assigning interrupt information to the first message portion, whereby the first message portion carries data information and interrupt information.

2. The system according to claim 1, wherein the external controller further comprises channel switching means for transferring a frame on the optional speech path in response to the interrupt information.

3. The system according to claim 1, further comprising:
   a second data terminal connected to the switching means, wherein frames are transferred between the second data terminal and the first data terminal;
   means for interrupting the transfer of frames between the first and the second data terminals in response to the interrupt information; and
   means for displaying information indicating the interruption in communication between the first and second data terminals.

4. The system according to claim 1, wherein the external controller comprises a digital telephone unit and an adaptor for the first data terminal.

5. The system according to claim 4, wherein the adaptor is incorporated into the digital telephone.

6. An integrated communication system, comprising:
   a plurality of telephone units;
   at least one data terminal;
   switching means for selectively connecting the plurality of telephone units and the data terminal to transfer a frame comprising fixed length message portions, each of the message portions carrying information; and
   an external controller connected to a first telephone of the plurality of telephones, the data terminal, and the switching means, the external controller comprising a data path for transferring data information carried on a first message portion to and from the data terminal, a main speech path for transferring audio information carried on a second message portion to and from the first telephone, and an optional speech path for transferring interrupt information to one of the telephones;
   wherein the switching means includes an optional control means for assigning interrupt information to the first message portion to transfer interrupt information on the interrupt communication path, whereby the first message portion caries data information and interrupt information.

7. The system according to claim 6, wherein at least one of the telephone units includes a speaker means for outputting the interrupt information.

8. The system according to claim 6, wherein the external controller includes a speaker means for outputting the interrupt information.

9. The system according to claim 6, wherein at least one of the telephones includes a visual indicator for displaying the interrupt information.

10. The system according to claim 6, wherein the external controller includes a visual indicator for displaying the interrupt information.

11. An integrated communication method for an integrated communication system having a plurality of telephone units; a plurality of data terminals; switching means for selectively connecting the plurality of telephone units and the data terminal to transfer a frame comprising fixed length message portions, each of the message options carrying information; and an external controller connected to a first telephone of the plurality of telephones, a first data terminal of the plurality of data terminals, and the switching means, the external controller comprising a data path for transferring data information carried on a first message portion to and from the data terminal, a main speech path for transferring audio information carried on a second message portion to and from the first telephone, and an optional speech path for transferring interrupt information to one of the telephones, the integrated communication method comprising the steps of:
   generating the interrupt information during a transfer of frames to and from the first telephone and during a transfer of frames to and from the fist data terminal; and
   assigning the interrupt information to the first message portion of a frame.

12. The method according to claim 11, further comprising the steps of:
   interrupting the transfer of frames to and from the first data terminal in response to the interrupt information; and
   displaying the interrupt information on a display.

* * * * *

UNITED STATES PATENT AND TRADEMARK OFFICE
CERTIFICATE OF CORRECTION

PATENT NO. : 4,989,235

DATED : January 29, 1991

INVENTOR(S) : Junichiro Nemoto

It is certified that error appears in the above-identified patent and that said Letters Patent is hereby corrected as shown below:

Claim 11, Column 10, Line 53, "fist" should be
--first--.

Signed and Sealed this

Thirteenth Day of October, 1992

Attest:

DOUGLAS B. COMER

*Attesting Officer*    *Acting Commissioner of Patents and Trademarks*